UNITED STATES PATENT OFFICE.

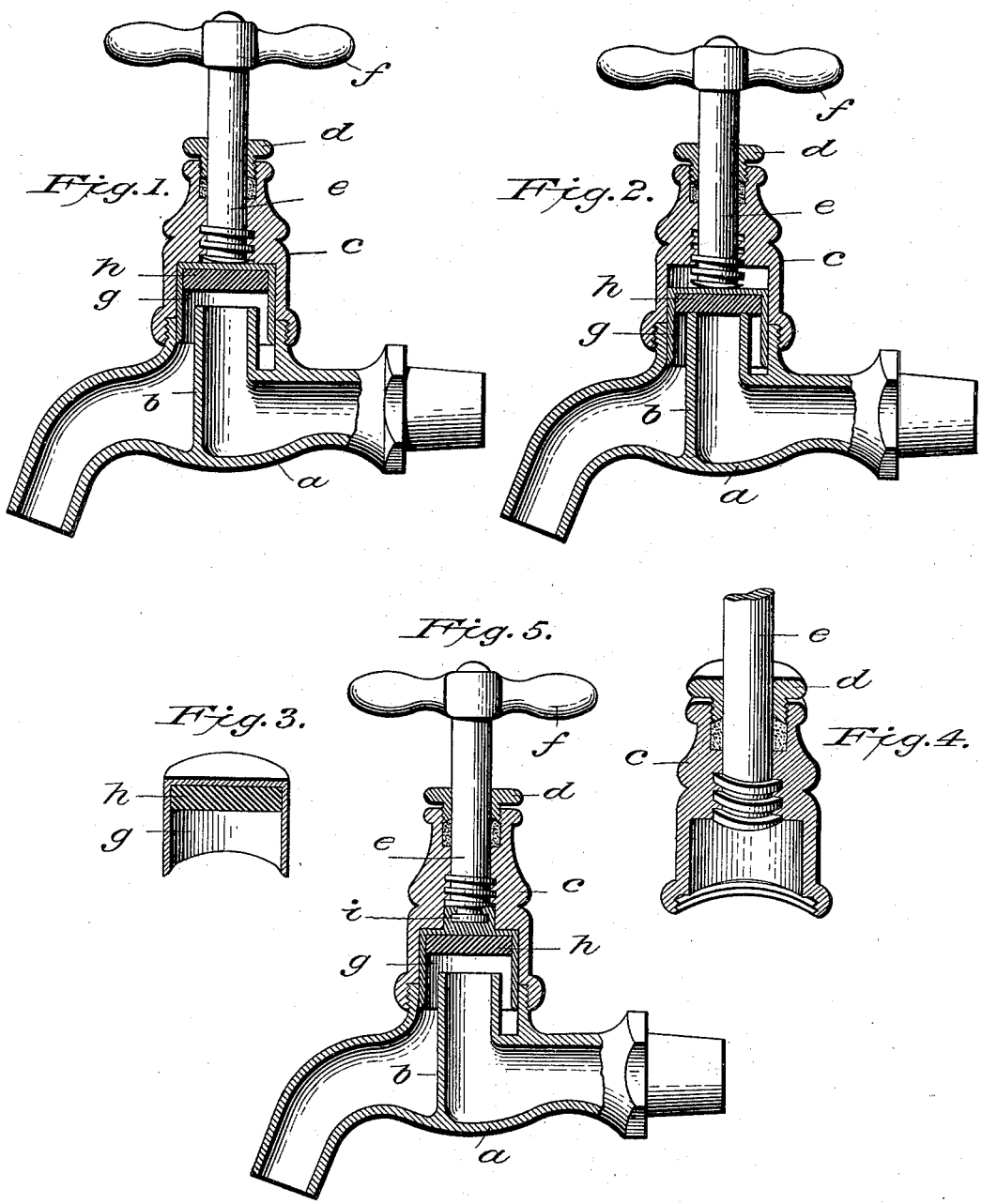

CHARLES S. FRISHMUTH, OF PHILADELPHIA, PENNSYLVANIA.

FAUCET.

SPECIFICATION forming part of Letters Patent No. 628,786, dated July 11, 1899.

Application filed April 1, 1898. Serial No. 676,089. (No model.)

*To all whom it may concern:*

Be it known that I, CHARLES S. FRISHMUTH, a citizen of the United States, residing at Philadelphia, in the county of Philadelphia and State of Pennsylvania, have invented a certain new and useful Improvement in Faucets, of which the following is a full, clear, and exact description.

This invention relates to faucets and similar valvular devices, and has for its special object to prevent leakage.

In faucets or bibs in common use ordinarily a flat seat is employed and a flat washer, which is forced against said seat by a screw-stem. When the washer is raised from the seat, the full pressure of the water or other fluid passing through the faucet or bib strikes the thread of the stem or plunger and forces its way through the packing and other devices and leaks out at the stem. This leakage is absent or insignificant when the faucet is first put into use, because of the presence of the packing and other devices that are used to prevent it. The packing, however, causes the stem to turn hard, and when by use the stem does turn easily it is at the expense of the wear of the packing and results in leakage.

The object of my invention is to provide a faucet or bib in which leakage is practically obviated; and with this object in view the invention consists in replacing the flat seat by a tubular seat and in replacing the flat washer by a tubular cap, which fits over the tubular seat and is provided with a suitable washer for making a water-tight joint. The external diameter and contour of this cap correspond, respectively, with the internal diameter and contour of the bore of the valve-body, and the said cap is thus fitted in the body with sufficient closeness and accuracy to prevent the leakage of the water between it and the body and out along the stem, and the internal diameter and the bore of the said cap relatively to the tubular seat are so much greater as to insure a large waterway for the free passage of the water. The tubular seat extends above the joint between the body and the bonnet and the tubular cap covers this joint, so as to prevent the water-pressure from being exerted on said joint, and such extension of the tubular seat also makes it accessible for being dressed or reground when necessary. The cap may be combined with a separate screw-stem or other operating device by superficial contact, or such operating device may be positively connected with the cap.

In the accompanying drawings, illustrating my invention, in the several figures of which like parts are similarly designated, Figure 1 is a vertical section showing the parts in open position. Fig. 2 is a similar view showing the parts closed. Fig. 3 is a sectional perspective view of the cap removed. Fig. 4 is a sectional perspective view of the bonnet and portion of the operating device. Fig. 5 is a vertical section, the parts being open, of a modification, showing the operating device and the cap positively connected.

The body $a$ may be of any approved construction, excepting that instead of a flat seat, such as is common, I use a tubular seat $b$, which projects well up into the head of the body.

$c$ is a bonnet which may or may not have the packing-gland $d$, and said bonnet is provided with a screw-thread to engage a complemental screw-thread on the body. This bonnet receives any suitable operating device for the valve proper, such as a screw-stem $e$, having a handle $f$.

$g$ is the valve proper, and it is made as a tubular cap of larger diameter than the diameter of the tubular seat $b$, so as to provide a free waterway to the exit-nozzle when the valve is open. This cap contains a washer $h$ of any suitable material capable of closing water-tight upon the seat and arranged loosely in the body.

In both forms of my invention the cap $g$ has one end open and the other end closed.

In one form of my invention the cap $g$ is wholly disconnected from the operating device, said operating device simply impinging upon its closed end to force the cap to its seat to close the faucet. When it is desired to open the faucet, the operating device is released from pressure upon the cap and the pressure of the passing fluid unseats or opens the cap.

In another form of my invention, as shown in Fig. 5, the operating device and the cap are connected by a common T-joint $i$, or any other suitable positive connection, in such manner that the cap will be moved positively by its operating device both to seat and unseat the cap.

It will be seen that the tubular or cylindrical cap in either case works freely in the body of the faucet or bib and requires only a loose washer therein to make a water-tight joint, and that the operating device for such cap is wholly separated from the water-passage by the interposed cap, and hence the liability to leakage is reduced to a minimum, even if not wholly removed.

The external diameter of the cap conforms to the internal diameter of the casing or shell, including the bonnet in which it works, and said cap conforms in external contour to the bore of said shell or bonnet, and hence it has a relatively snug or tight fit in said bore, whereby is prevented the escape of the water between the cap and the shell and bonnet and thence out along the stem.

By comparing Figs. 1 and 5 with Fig. 2 of the accompanying drawings it will be seen that the cap $g$, which is fitted tight to the body or casing of the valve and its bonnet and covers the joint between them and also surrounds the tubular seat $b$ with an intervening space between their vertical walls, always, as well in the open as in the closed position, surrounds said seat and joint. In other words, when the valve is open, as in Figs. 1 and 5, the tubular cap does not rise above the tubular seat and the joint between the body and bonnet. It follows, therefore, that the incoming fluid flows first into the interior of the cap before it reaches the cavity in the body, shell, or casing and is directed by said cap to the outlet of the faucet, and in this way the pressure is diverted to the outlet at a point or level beyond the edge of the tubular cap and said joint, and hence its tendency to work up between the edge of the cap and the body of the faucet and so to leak along the stem and at the said joint is minimized if not wholly overcome, whereas in that class of valves in which the plug must be lifted clear of the seat and expose the joint of the body and bonnet the initial pressure is free to exert itself about the edge of the plug in every direction and to find its way out along the stem and such joint, thereby causing leakage. The above-stated operation of my tubular cap applies as well to a cap provided with a washer as to one with a ground or other joint.

The tubular seat projecting above the joint between the bonnet and body is freely accessible for dressing or being reground when the bonnet is removed.

In all of the faucets with which I am familiar in which a cap is used instead of a flat washer or disk such cap has not been movable freely in the body of the faucet, but has had a screw-threaded connection therewith, so as to require its rotation in order to effect the opening and closing of the device. Such screw-thread not only adds to the cost of the valve, but also requires a great nicety of fit and adjustment, and also it is a source of wear, and consequently reduces the lifetime of the faucet. It also renders the cleaning and the repairing of the valve more difficult and costly than is the case with a freely-moving cap, such as that employed by me.

What I claim is—

1. A faucet or similar valvular device, having a suitable body, a tubular seat standing up within the same and extending above the level of the joint of the bonnet with the body, a bonnet jointed with said body so that when removed, the mouth of the seat is exposed above the body and freely accessible for dressing or regrinding, a tubular cap surrounding the said seat and said joint and of greater internal diameter than the external diameter of the seat, to provide a large waterway between the cap and the seat when the valve is opened, and of a length sufficient to surround the said seat and joint as well when the valve is opened as when closed, and of an external diameter and contour conforming to the internal diameter and contour of the bore of the body and fitted thereto substantially leak-tight, the incoming fluid discharging upwardly through the seat into the tubular cap when the valve is opened and being by it directed into the waterway between itself and the tubular seat and past the edge of the tubular cap into the outlet, and means to control the movement of the said cap to permit the opening and closing of the said faucet, substantially as described.

2. A faucet or similar valvular device, having a suitable body, a tubular seat standing up within the same and projecting beyond the bonnet-joint, a bonnet jointed to the body below the outlet of the said seat, so that when the bonnet is removed the seat is accessible for dressing or regrinding, a tubular cap surrounding the said seat and of greater internal diameter than the external diameter of the seat, to provide a large waterway, and of an external diameter and contour conforming to the external diameter and contour of the bore of the body and of a length sufficient always to cover the joint between the body and bonnet, and fitted to the body and bonnet with sufficient accuracy to preclude the leakage of fluid between these parts and out along the operating device and joint, a loose washer arranged in said tubular cap and adapted to coöperate with the edge of the tubular seat to close the faucet, and means to control the movement of the said cap to permit the opening and closing of the said faucet, substantially as described.

In testimony whereof I have hereunto set my hand this 31st day of March, A. D. 1898.

CHARLES S. FRISHMUTH.

Witnesses:
WALTER HEMSTEAD,
JOSEPH H. KEYS.